United States Patent [19]

Young et al.

[11] Patent Number: 5,005,682

[45] Date of Patent: Apr. 9, 1991

[54] AIR POWERED TORQUE CONTROL TOOL DRIVER WITH AUTOMATIC TORQUE DISCONNECT

[75] Inventors: Raymond L. Young; James A. Sjovall, both of Sioux City, Iowa

[73] Assignee: Sioux Tools, Inc., Sioux City, Iowa

[21] Appl. No.: 543,159

[22] Filed: Jun. 25, 1990

[51] Int. Cl.[5] .......... B23Q 5/06

[52] U.S. Cl. .......... 192/0.034; 475/317; 173/12; 192/150

[58] Field of Search .......... 475/317, 331, 338; 74/337; 173/12; 192/0.034, 150

[56] References Cited

U.S. PATENT DOCUMENTS

| | | | |
|---|---|---|---|
| 2,764,272 | 9/1956 | Reynolds | 192/150 |
| 4,049,104 | 9/1977 | Webb | 192/0.034 |
| 4,265,320 | 5/1981 | Tanaka et al. | 192/0.034 |
| 4,328,871 | 5/1982 | Gluskin | 192/0.034 |
| 4,758,754 | 7/1988 | Fink et al. | 192/0.034 |

*Primary Examiner*—Allan D. Herrmann

*Assistant Examiner*—William O. Trousdell

*Attorney, Agent, or Firm*—McCaleb, Lucas & Brugman

[57] ABSTRACT

A torque control tool driver having a torque responsive clutch which holds a rotatable ring gear of a motor driven reduction gear train stationary to effect rotation of a tool driving spindle and which is operable in the presence of pre-determined torque output of such spindle to automatically release the ring gear for rotation whereby to disconnect the spindle from the driving motor. Following spindle disconnect, the driving motor is automatically deenergized in response to rotational movement of the ring gear.

8 Claims, 3 Drawing Sheets

AIR POWERED TORQUE CONTROL TOOL DRIVER WITH AUTOMATIC TORQUE DISCONNECT

This invention is directed to torque controlled tools and more particularly to improvements in torque applying tool drivers capable of applying predetermined torque to a rotatably driven work engaging tool.

In torque control tools of the type to which the present invention is directed, the main purpose is to apply predetermined torque values to a work engaging tool. Importantly the tool must include means for adjusting the target torque over a range of tolerance to accommodate particular requirements.

In the case of driving threaded fasteners the characteristics of the threaded joints may vary widely depending on the material being clamped or fastened. Tools used for fastener application purposes are classified in terms of torque rate which is defined as the amount of torque required to turn a nut or other fastener through 360°. A "hard" joint is one which has a high torque rate, while a "soft" joint is one having a low torque rate. The hard joint is one of the most difficult to deal with because there are less degrees of rotation of the torque applying tool within the target torque tolerance limits than there are in soft joint fastening. This requires a shut down of the tool within a much shorter time interval when applying hard joint fastener.

Typically such torque control tools are pneumatically powered although electrically powered tools of that order also are available. However, the embodiment of this invention which is disclosed herein is directed to a pneumatically powered tool as a preferred embodiment of its teachings. In torque control tools of the pneumatic variety, it is not sufficient just to shut off the compressed air supply to the motor when a desired torque load has been applied to the fastener. Such shut off operation usually takes too much time and the compressed air between the shut off valve and the motor continues to apply torque to the fastening tool until the compressed air is finally dissipated. In addition, the inertia of the motor and related mechanisms continues to apply torque to the motor driven tool driving spindle until the motor is stopped.

The prior art has attempted to overcome this difficulty by utilizing torque responsive clutches between the driving motor and the tool driving spindle. Usually such clutches take the form of a rotatably driven clutch plate having a series of grooves and lands arranged along a circular path to accommodate ball bearings, normally located in the grooves, which are capable of being forced out of the grooves against spring pressure when a designated torque value or range of torque limits has been achieved by the tool driving spindle. In this fashion, upon achieving the desired torque level of the tool spindle, the latter is automatically released by operation of the clutch mechanism, thus isolating the fastener from the driving torque supplied by the air motor.

In such clutch mechanisms, spindle disconnect is achieved by the movement of the balls from the grooves onto the raised lands. Such ball movement is also utilized for effecting automatic shut-off of the air powered motor. However, these past developments invariably achieve motor shut off prior to disconnect of the tool driving spindle, which permits the motor to provide an inertia kick to the fastener engaging tool and tool driving spindle before disconnect of the latter takes place. If such an operation takes place when encountering a "hard" joint, the error in torque applied to the fastener will depend largely on how quickly disconnect of the tool driving spindle occurs after motor shut off.

Generally in prior art mechanisms employing a disconnecting clutch, as briefly described above, torque applied to the tool driving spindle is sensed by a ball, roller or tab moving up and over a ramp in a rotatable cam plate. The ball is normally held at the bottom of the ramp by adjustable spring pressure so that the spring force increases as the ball proceeds up the ramp due to increased spring compression. Such movement of a ball up a ramp is typically utilized to shut off the motor. As a consequence, the target torque desired at the output of the tool driving spindle is reached at some point while the clutch ball or balls are still travelling up the ramp, and this motion is used to shut-off the motor prior to the disconnecting operation between the clutch and the tool driving spindle which occurs as the ball escapes the ramp. This is so because if spindle disconnect were to occur before motor shut down, there would be no continued movement of the ball up the ramp to shut the tool off.

BRIEF SUMMARY OF THE INVENTION

In recognition of the foregoing noted problem of the prior art tool driving devices of the character discussed, the present invention is directed to new and improved mechanism for sensing the torque output for a rotating tool driving spindle and automatically disconnecting the tool driving spindle from the torque applying motor when a predetermined level of spindle torque output is achieved. Once spindle disconnect has occurred, and after a predetermined time delay, means are provided for positively shutting down the drive motor of the tool. The torque sensing and spindle disconnect functions, are carried out by a torque responsive clutch mechanism embodying a cam plate having a plurality of circumferentially spaced grooves separated by intervening raised lands, with the lands and grooves being interjoined by intervening cam surfaces adapted to cause a ball bearing in each of the grooves to move out of each groove onto a land in the presence of a predetermined torque load of the tool driving spindle. Such predetermined torque load or output for the spindle is effected by means of a compression spring capable of being adjustably regulated to effect desired operation of the clutch mechanism to produce automatic release or disconnect of the tool driving spindle from a torque supplying motor or power source. The time delayed, positive motor shut off activity or function is achieved by additional cam means associated with spindle disconnecting operation the clutch mechanism for effecting axial translation of a rod mechanism associated with a motor cut-off valve. As a consequence, in accordance with the present invention, inertia impact of the tool driver and tool driving spindle is eliminated once a predetermined torque level or target zone has been reached by reason of the positive disengagement of the tool spindle from the driving source followed by a subsequent deenergization or shut down of the motor or driving source which isolates the tool driving spindle from further torque forces.

It is an important object of this invention to provide a new and improved torque control tool driver capable of accurately applying preselected torque loads to a fastener applying tool.

A still further object of this invention is to provide an improved torque control tool driver as noted in the preceding object, which is capable of sensing a predetermined torque output of a tool driving spindle, automatically disconnecting the spindle from its torque applying source at said sensed torque level and thereafter deenergizing the motor to prevent further torque application to the spindle.

A still further important object of this invention is to provide an improved pneumatic torque control tool driver employing an air powered motor for rotatably driving a tool driving spindle and which is operable to disconnect the spindle from the torque applying motor at a preselected level or value of torque output at the spindle while isolating the spindle from unwanted inertia torque of the mechanism.

Still another object of this invention is to provide an improved torque control tool driver which is capable of sensing the torque output of a rotatably actuated tool driving spindle, but in which the torque sensing mechanism is not an integral part of the spindle.

The above and further objects, features and advantages of this invention will appear from time to time from the following detailed description of a preferred embodiment thereof illustrated in the accompanying drawings and representing the best known mode presently contemplated for enabling those of skill in the art to practice this invention.

DESCRIPTION OF THE PREFERRED EMBODIMENT

Figures 1, 1A:
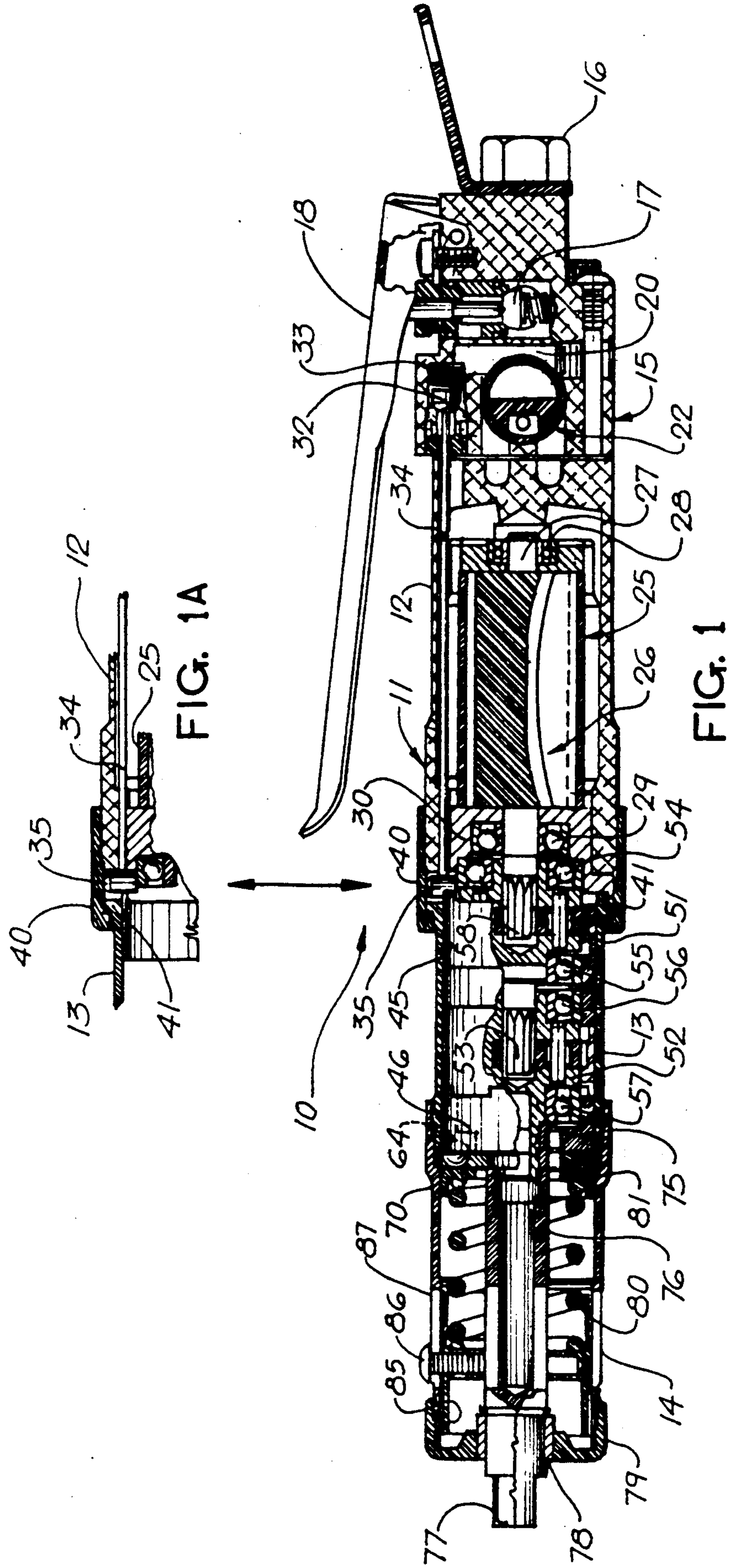
FIG. 1 is a longitudinal cross sectional view, with parts thereof in elevation, of a tool driver in accordance with this invention.
FIG. 1A is an enlarged sectional view of a portion of the assembly, set out in FIG. 1 to illustrate features of the motor shut off mechanism thereof.
Figure 2:
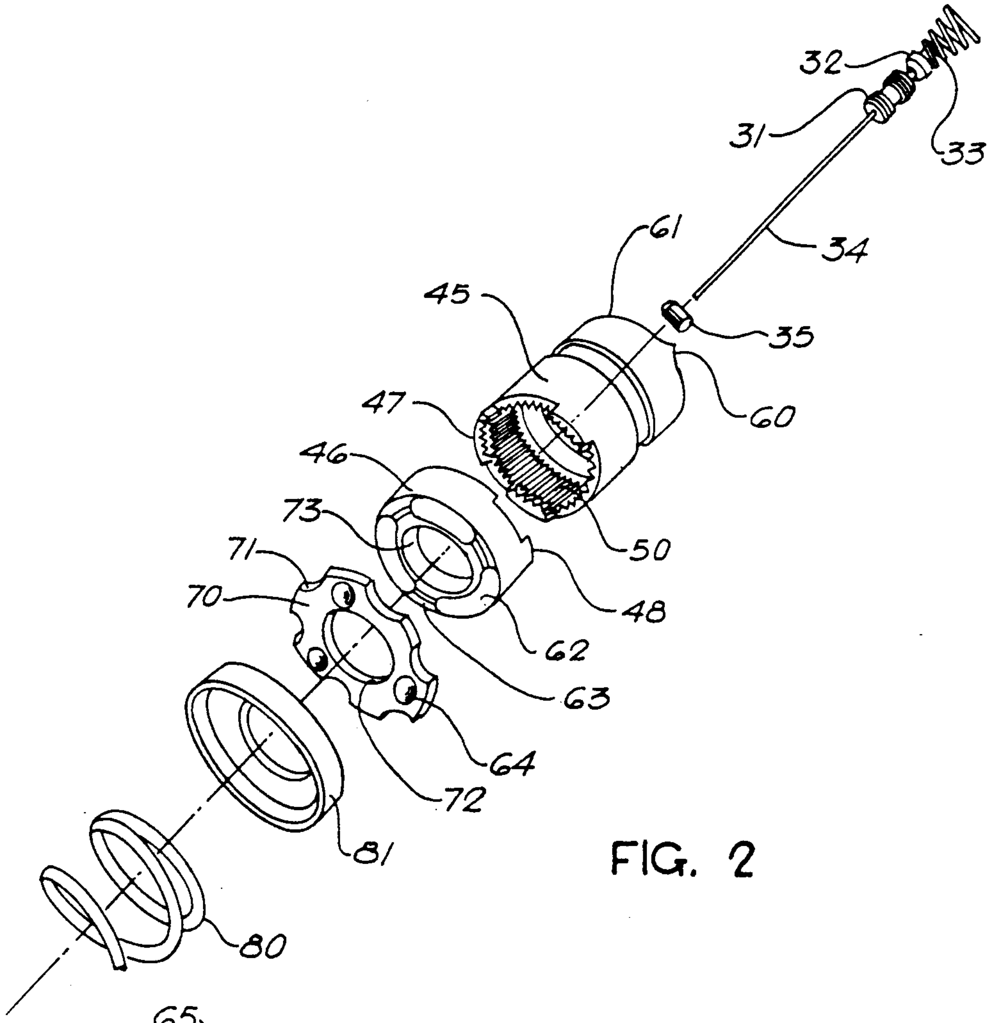
FIG. 2 is an exploded perspective of the torque sensing and motor shut off mechanism of the tool driver illustrated in FIG. 1.

With initial reference to FIGS. 1 and 2 of the drawings a pneumatic tool driver, of this invention, indicated generally at 10, comprises an elongated generally cylindrical body 11 for containing various operating mechanism as will appear presently.

Body 11 is made up of three interlocked, coaxial tubular sections or casings, namely motor casing 12, gear and clutch casing 13 and spring casing 14.

Motor casing 12 includes a rear section 15 which forms an air control manifold having an air inlet fitting 16 for connection to a source of compressed air. An intake control valve 17 is responsive to movements of a manually engageable operating lever 18 pivotally mounted on the body of section 15. Depressing lever 18 serves to open the spring loaded, plunger actuated valve 17 permitting compressed air to enter an internal distribution chamber 20. Conversely releasing lever 18 shuts off the air supply to chamber 20. Chamber 20 contains a shut-off and reversing valve means 22 which operably control the supply of air to a vane type air motor 25 and determines the direction of rotation of the motor's rotor 26.

It will be noted that motor 25 has a central rotor shaft 27 which is supported at one end by bearing means 28 carried by the body of valve means 22. The opposite or outer end of rotor shaft 27 also is supported in bearing means 29 carried coaxially of an end plate 30 mounted over the outer end of the motor casing 12.

In addition to the valve means 22, manifold section 15 also contains a pilot valve 31, incorporating a resilient plunger 32 which is biased by spring means 33 to close the pilot valve (see FIGS. 2 and 8–10). Plunger 32 is coupled to one end of and actuated by an elongated plunger rod 34 that extends forwardly from the plunger through the motor casing 12 and end plate 30 where it engages an actuating roller 35 (see FIGS. 1A and 4–7). Rearward translation of rod 34 serves to compress spring 33 and unseat plunger 32 to "open" the pilot valve which thereby unbalances valve means 22 sufficiently to permit the compressed air in chamber 20 to close valve 22 and thereby deactivate motor 25.

The gear and clutch casing 13, is secured coaxially to the outer end of motor casing 12 by means of an internally threaded rear retainer cap 40. The cap slides over the exterior of casing 13 to engage a radially outward extending flange 41 thereon. The cap is threaded over external threads adjacent the outer end of the motor casing 12, as shown in FIGS. 1 and 1A.

Casing 13 coaxially houses a cylindrical ring gear member 45 and an annular clutch member 46 (see FIG. 2). The ring gear and clutch members are interjoined for conjoint rotation by means of interfitting axial jaw extensions 47 and 48, respectively, at adjacent ends of such two members (see FIG. 2).

Figure 12:
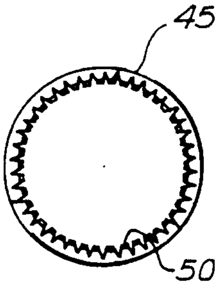
FIG. 12 is a left hand end elevation of the ring gear shown in FIG. 11.
Figure 13:
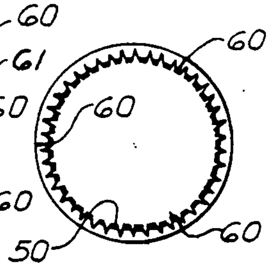
FIG. 13 is a right hand end elevation of the ring gear shown in FIG. 11.
Figure 14:
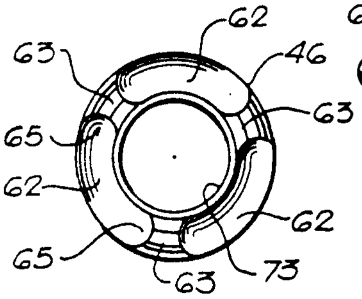
FIG. 14 is a left hand end elevation of a cam actuated clutch ring member employed to the assembly of FIG. 1.
Figure 17:
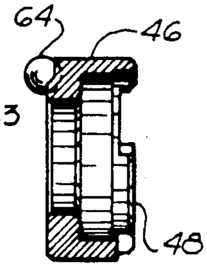
FIG. 17 is a transverse cross section of the clutch member shown in FIGS. 14–16.
Figure 15:
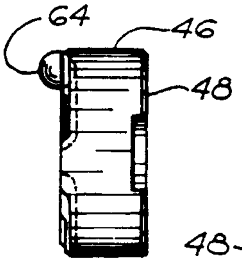
FIG. 15 is a side elevational view of the clutch member illustrated in FIG. 14.
Figure 16:
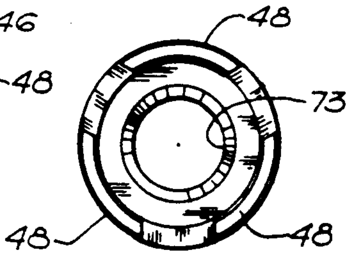
FIG. 16 is a right hand end elevation thereof.

The ring gear member 45 (see FIGS. 11-13) is formed with internal ring gear teeth 50 adjacent its ends for engagement with a pair of planetary gear assemblies 51 and 52 which are coaxially aligned. A splined stub shaft 53 of assembly 51 fits into a hub cage of assembly 52 to drivingly engage the planetary gears thereof. The two gear assemblies 51 and 52 are appropriately externally supported at their ends and held in coaxial alignment by ball bearing assemblies 54, 55, 56 and 57.

Gear assembly 51 also receives a splined outer end 58 of the rotor shaft 27 which fits into the hub of assembly 51 to mesh with and drive its planetary gears. In this manner the rotational output of the motor shaft 27 is appropriately reduced via the two stage planetary gear arrangement.

Figure 11:
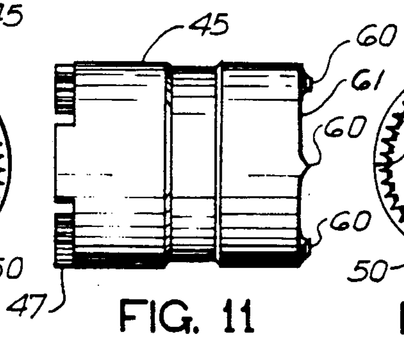
FIG. 11 is a side elevational view of a ring gear shown in the assembly of FIG. 1.

As shown best in FIGS. 2 and 11, the ring gear member 45, is further distinguished by three axially projecting cam nodes 60, 60 at the inner end 61 thereof. Such nodes are located at 120° circumferential intervals and are adapted to periodically engage the roller 35 to shut off motor 25, as will be amplified in greater detail under the operational description hereinafter.

As noted previously the interfitting jaws 47 and 48 serve to couple the annular clutch member 46 to one end of the ring gear member 45. The clutch member is particularly distinguished by three circumferentially spaced semi-circular grooves 62, 62 which are separated by intervening raised lands 63, 63 symmetrically spaced at 120° intervals. Each of the grooves is configured to accept a ball bearing 64 for movement therealong while the opposite ends of each groove 62 are formed with a riser cam surface 65 which permits a ball engaged therewith to raise out of its groove 62 and ride over the adjacent land in the presence of predetermined torque loads on the clutch member. When such activity of the clutch balls occur, the ring gear and clutch members are free to rotate within the casing 13.

Figure 20:
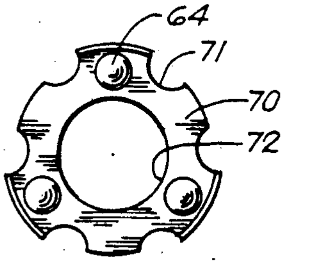
FIG. 20 is a end elevation of a ball retainer employed with the clutch ring of FIGS. 14–16.
Figure 21:
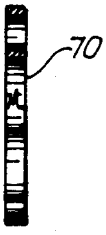
FIG. 21 is a side elevation of the ball retainer shown in FIG. 20.

As shown best in FIGS. 2, 20 and 21, a ball retainer ring or plate 70 is employed adjacent the grooved outer end of the clutch member 46, to retain balls 64 in proper 120° spaced positions. Plate 70 is formed with three spaced key recesses 71 in its periphery which interlock with corresponding locking projections (not shown) formed on the interior of the gear casing 13 whereby plate 70 is stationarily locked against rotation. It also will be noted that the ball retainer plate 70 as well as the clutch plate 46 are distinguished by large central, openings 72 and 73, respectively, through which the externally splined hub shaft 75 of the second planetary gear assembly 52 extends. This permits the internally splined inner end of a tool driving spindle 76 to interlock with the outer end of gear shaft 75 for conjoint rotation therewith.

The tool driving spindle rotates at the reduced speed effected by the double planetary reduction gear trains 51 and 52 and is housed coaxially of the cylindrical spring casing 14 as shown in FIG. 1. The spindle is formed with tool connective flats 77 at its outer end is rotatably supported in bearing means 78 mounted coaxially of end cap 79 which closes over the outer end of the spring case 14; the latter being threaded onto external threads adjacent the outer end of gear case 13.

Figure 18:
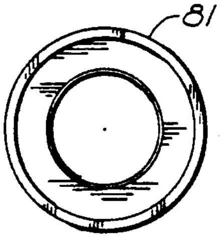
FIG. 18 is a end elevation of a thrust ring employed with the clutch member shown in FIGS. 14–16.
Figure 19:
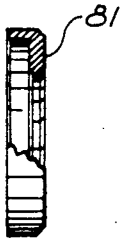
FIG. 19 is a side elevation of the thrust ring illustrated in FIG. 18 with portions thereof in cross section.

Internally spring case 14 supports a larger compression spring 80, the inner end of which is supported by a thrust ring cup 81 which abutts the ball retainer ring 70 (see FIGS. 2, 18 and 19). The outer end of spring 80 is supported by an adjustment nut 85 having external threads engageable with internal threads formed on the inside wall of the spring casing 14. Threaded adjustment of nut 85 serves to regulate the compressive force applied to the thrust cap 81, clutch balls 64 and ball retainer 70. This in turn determines the torque load required to move the clutch balls out of their recessed grooves 62 onto the lands of the clutch ring. A locking bolt 86 extends through slot 87 in casing 14 for threaded connecting with the adjustment nut whereby to lock the latter in its adjusted axial position.

Use and Operation

In operating a torque control tool with the driver 10 of this invention, it will be noted that torque is sensed at the ring gear 45 of the planetary gear system. While the torque magnitude at the ring gear is not the same as the magnitude of the torque output of the tool driving spindle 76 it is directly proportional thereto and can be calibrated in terms of the spindle's output torque.

Normally the ring gear is a stationary member which is fixed to the housing via the clutch ring 46; balls 64 and retainer ring 70. Thus the ring gear withstands the reaction torque of the power train. If the balls 64 escape their grooves and ride up the riser ramps onto the clutch lands 48, the clutch ring and ring gear are free to turn until the balls enter the next set of grooves and engage the next cam ramps or risers. The balls 64 are held from escaping their grooves and going up and over the riser ramps 65 by the force exerted by the large compression spring 80 which force can be regulated to accommodate a range of target torques for the tool. It also is to be noted that by providing a three ball clutch system, the balls are concentrically loaded by the spring to provide for uniform clutch operation.

When the balls escape the riser ramps, the ring gear is free to rotate as noted and thus does not provide the reaction torque for the power train. This effectively disconnects the tool driving spindle from the motor substantially simultaneously with the sensing of the predetermined target torque which causes the balls to move up the cam risers.

Figure 3:
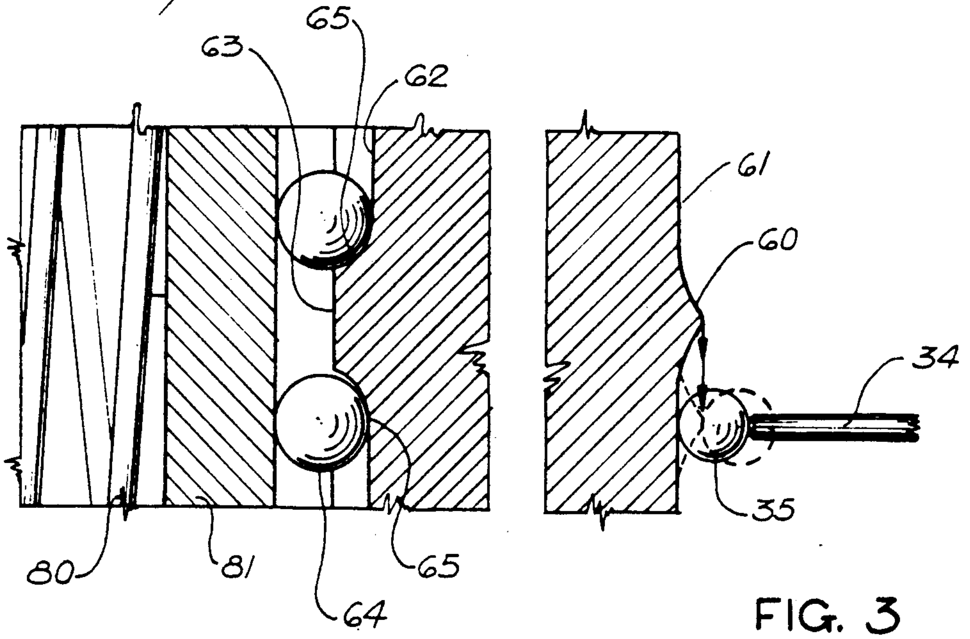
FIG. 3 is an enlarged schematic illustration of the torque sensing and motor shut off mechanisms illustrated in FIG. 2 depicting the mode of operation thereof.
Figure 4:
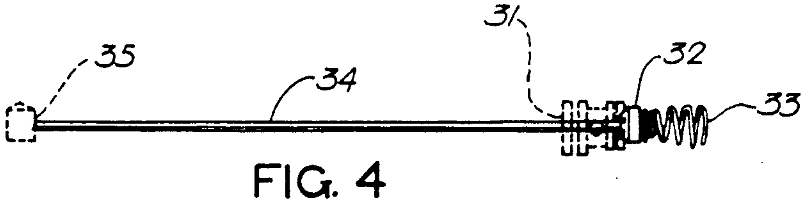
FIG. 4 is a detailed view in side elevation of the assembly for shutting off the driving motor of the FIG. 1 assembly.
Figure 6:
FIG. 6 is and end elevation of the roller shown in FIG. 5.
Figure 10:
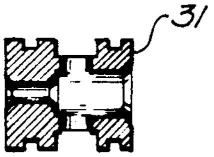
FIG. 10 is a longitudinal cross sectional view of the pilot valve shown in FIG. 8.
Figure 8:
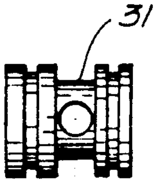
FIG. 8 is a side elevation of a pilot valve associated with the assembly of FIG. 4.
Figure 9:
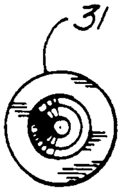
FIG. 9 is a right hand end elevational view of the pilot valve shown in FIG. 8.
Figure 5:
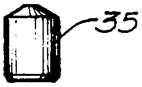
FIG. 5 is an enlarged elevational view of a cam roller associated with the assembly illustrated in FIG. 4.
Figure 7:
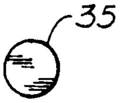
FIG. 7 is end elevation of the opposite end of the roller shown in FIG. 5.

As illustrated in FIG. 3, when the balls escape the ramps or cam risers, a cam node 60 on the inner end of ring gear 45 engages the roller 35 to actuate pilot valve 32 to shut off the motor 25. This shut off operation and stopping of the motor is accomplished before the ring gear turns to a point where the balls 64 enter the next set of grooves. This sequence of operation whereby the motor shut-off is positively subsequent to spindle disconnect is assured by location of the cam nodes 60 which are aligned with the center of the lands 63 between successive ramps or cam risers 65 and grooves 62. Thus there is no possibility of the motor shut off prior to spindle disconnect. As a result there is no possible chance for an inertia impulse from the motor or power train to be imparted to the tool driving spindle and the connective joint being impacted thereby.

Having described this invention it is believed that those familiar with the art will readily recognized the improved advancement of this invention over the prior art. Further, while this invention has been described in relation to a particular preferred embodiment thereof, illustrated in the drawings, it will be understood that the same is susceptible to variation, modification and substitution of equivalents without departing from the spirit and scope of the invention which is intended to be limited only as appears in the following appended claims.

The embodiments of the invention in which an exclusive property or privilege is claimed are defined as follows:

1. A torque control tool driver comprising:

a housing;

a motor mounted in said housing;

a tool driving spindle rotatably mounted at one end of said housing, reduction gear means comprising a ring gear and planetary gears rotatably mounted in said housing and driven by said motor, torque responsive clutch means for transmitting torque from said gear means to said spindle and operable at predetermined torque output of said spindle to prevent transmission of torque thereto;

said clutch means being operable to hold said ring gear stationary until said predetermined torque output is reached whereupon said ring gear is released for rotation to prevent torque transmission to said spindle; and means operable subsequent to preventing transmission of torque to said spindle for shutting off said motor.

2. The torque control tool driver of claim 1, wherein said motor is an air motor driven by compressed air, and said means for shutting off said motor operates to shut off the supply of air thereto.

3. The tool driver of claim 2, and cam means on said ring gear operable to actuate valve means for isolating said motor from said supply of air.

4. A pneumatically powered tool driver adapted to rotatably drive fasteners with automatic torque control, comprising:

a housing, a pneumatically powered motor mounted in said housing and communicating with a supply or pressurized air, first valve means for controlling the supply of air to said motor, pilot valve means for closing said first valve means to isolate said motor from said supply of air, reduction gear means comprising a ring gear rotatably mounted in said housing and planetary gear means engaging said ring gear and rotatably driven by said motor, tool driving spindle means rotatably driven by gear means, torque responsive clutch means engaged with said ring gear for holding the same stationary and operable to release said ring gear for rotation relative to said housing upon predetermined torque output of said spindle means; such rotation of said ring gear preventing driving rotation of said spindle means;

and cam means on said ring gear for effecting operation of said pilot valve means to close said first valve means in response to predetermined rotation of said ring gear.

5. The combination of claim 4 and manually operable means for controlling said first valve means.

6. The combination of claim 4 wherein said clutch means comprises a clutch ring having three circumferentially spaced arcuate grooves, separated by intervening lobes; each groove being configured with cam risers at its opposite ends, a ball retainer plate stationarily coupled to said housing adjacent said ring and carrying plural rotatable ball bearings, one in each of said grooves; said ball bearings being adapted to override said risers and escape said grooves in the presence of said predetermined torque output of said spindle, and spring means operable to supply predetermined compressive force on said plate and ball bearings determinative of said predetermined torque output.

7. The combination of claim 6 the means for regulating the force of said spring means.

8. The combination of claim 4, and roller means mounted for engagement by said cam means upon said predetermined rotation of said ring gear, thrust rod means engageable with said roller means and having connection with said pilot valve means to operate the latter to close said first valve means in response to movement of said roller means over said cam means.

* * * * *